C. W. SAALBURG.
CHANGEABLE PICTURE.
APPLICATION FILED JULY 10, 1917.
1,305,835.
Patented June 3, 1919.
2 SHEETS—SHEET 1.
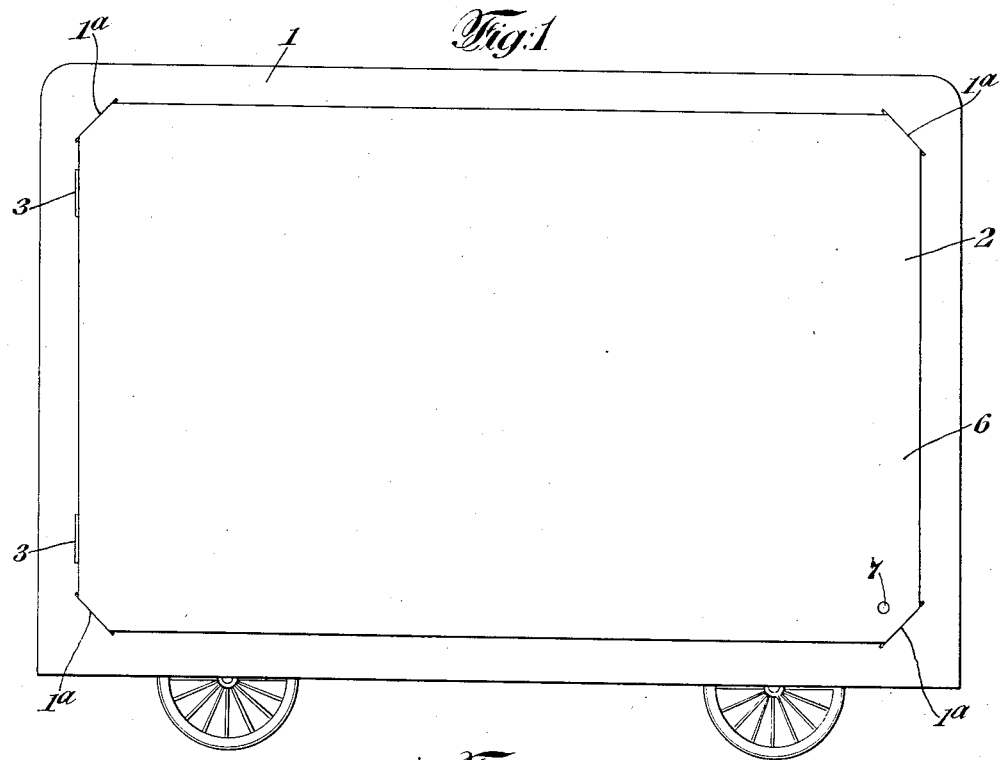
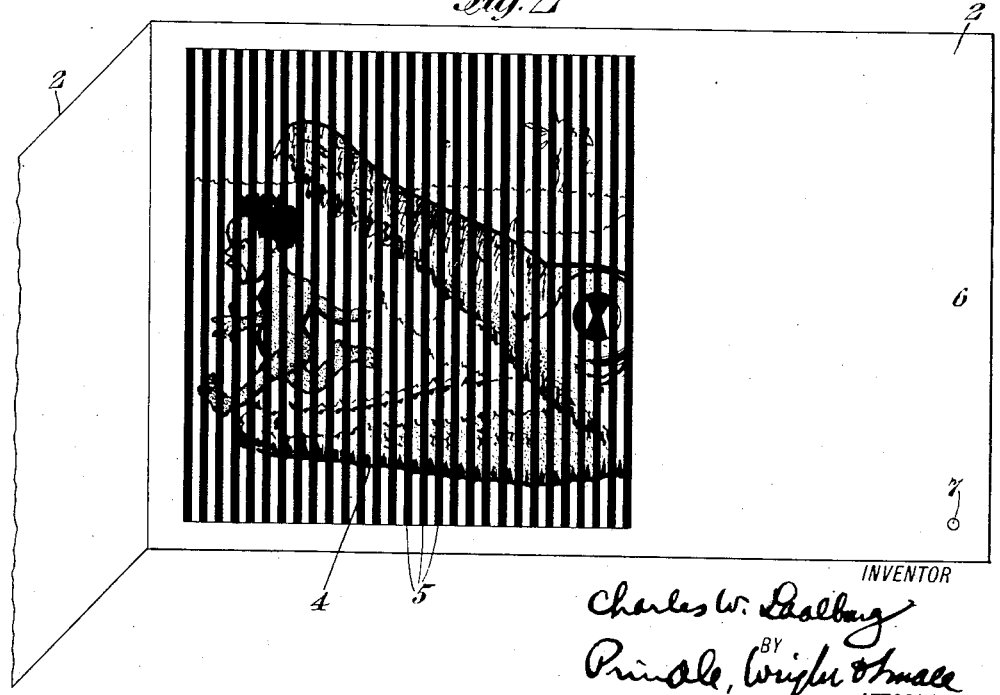
INVENTOR
Charles W. Saalburg
BY
Pringle, Wright & Small
ATTORNEYS

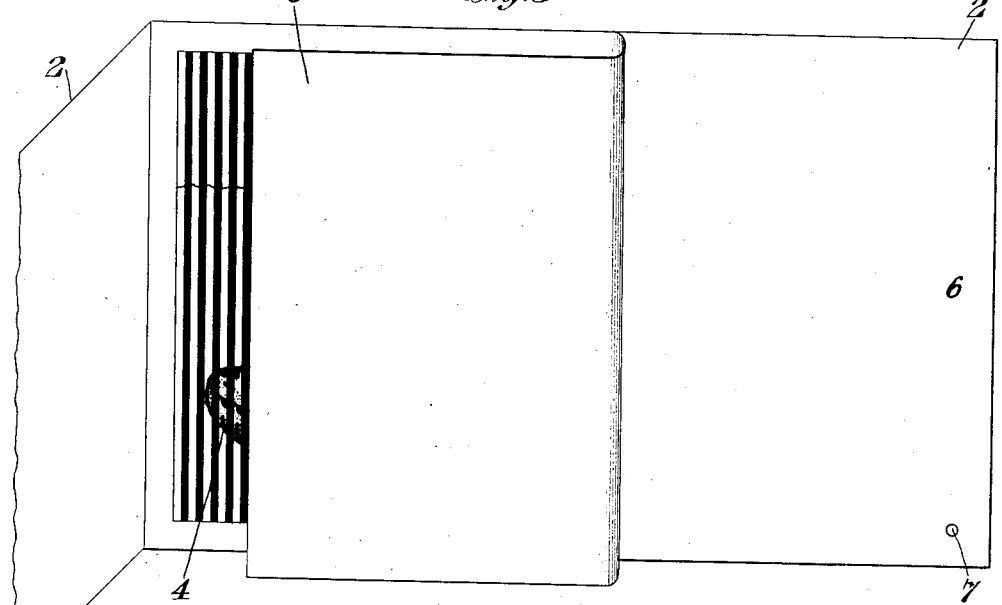
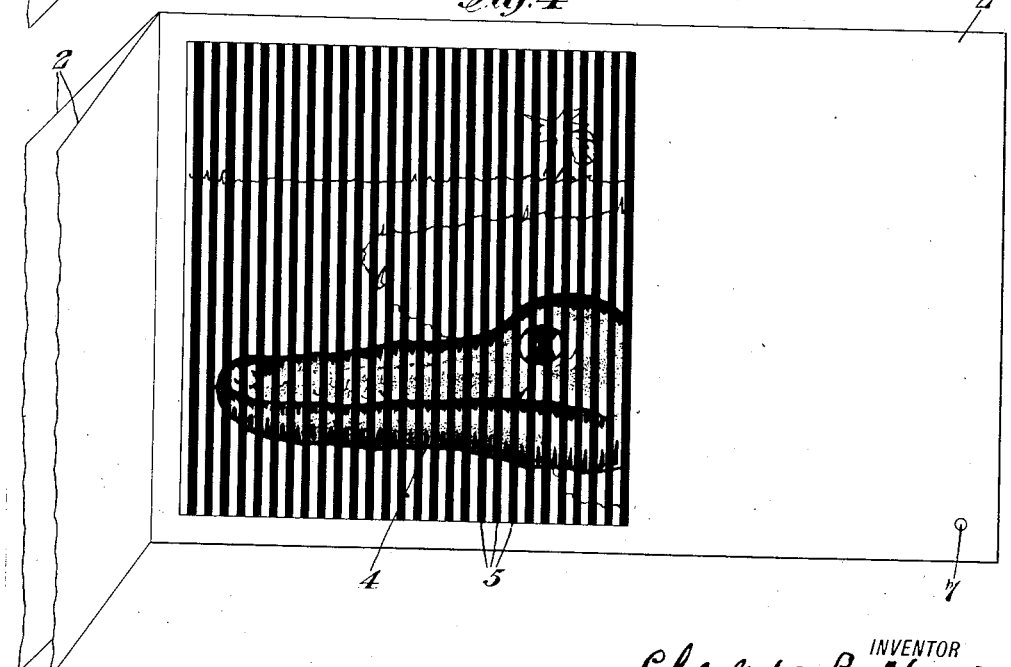

UNITED STATES PATENT OFFICE.

CHARLES W. SAALBURG, OF RICHMOND HILL, NEW YORK, ASSIGNOR TO ANIMATED PICTURE PRODUCTS COMPANY, A CORPORATION OF DELAWARE.

CHANGEABLE PICTURE.

1,305,835. Specification of Letters Patent. Patented June 3, 1919.

Application filed July 10, 1917. Serial No. 179,609.

*To all whom it may concern:*

Be it known that I, CHARLES W. SAALBURG, of Richmond Hill, in the county of Queens, and in the State of New York, have invented a certain new and useful Improvement in Changeable Pictures, and do hereby declare that the following is a full, clear, and exact description thereof.

My invention relates particularly to an apparatus by means of which pictures are used to give the effect of movement therein.

The object of my invention is to provide an apparatus by means of which a plurality of pictures may be operated in such a way as to give the effect of movement, and in such a way that the movement may, if desired, take place continuously as long as the apparatus is operating. A further object is to provide an apparatus of this kind in such a form that it may be readily made and conveniently operated. A further object is to provide an apparatus of this character so arranged that a large number of changeable combinations in pictures may be provided, each of said combinations being capable of operation alone so as to produce continuous motion. A further object is to provide a construction of this character which is arranged with a shutter in a convenient manner, in such a way that the view of one picture is cut off before the view of the succeeding picture is obtainable, thus giving time for the eye to adjust itself between the successive pictures. A further object is to provide pictures of the above character which are shown in such a way that one picture will be comprised of a set of spaced strips or lines and the adjacent or next picture will be comprised of a set of spaced strips or lines occupying positions corresponding to the spaces in the first mentioned picture, so that after the first picture is viewed the next picture will produce its impression by filling in the spaces contained in the first picture, but showing the subject in a different position, thus giving the effect of motion. A further object is to make use of the intervals or spaces referred to so as to have them represent the bars of a cage or show wagon. Another object is to provide movable sets of pictures of the above character which may be inserted in the front of a cage or show wagon, which cage or show wagon, by way of example, may be shown as a picture. Further objects of my invention will appear from the detailed description thereof contained hereinafter.

While my invention is capable of embodiment in many different forms, for the purpose of illustration I have shown only one form thereof in the accompanying drawings, in which—

Figure 1 is a front elevation of an apparatus made in accordance with my invention showing the insert in position;

Fig. 2 is a front elevation of an insert showing it in operation in the initial position prior to producing the effect of motion;

Fig. 3 is a similar view of the same showing the parts in intermediate position in which the shutter has cut off the first picture from view; and Fig. 4 is a similar view showing the stage of the movement where the second picture is visible and the first picture has been moved from the front thereof.

In the drawings I have shown a cage or show wagon 1 having diagonal slits 1ª at the four corners thereof to receive an insert in the form of a picture comprising a plurality of leaves 2 bound together at their extreme left end portions by staples 3, or in any other suitable manner. The leaves 2 carry pictures 4 made up of a plurality of spaced strips 5 arranged in such a position as to leave at the outer ends of the leaves 2, flaps 6 of considerable size to act as shutters in the manner hereinafter described. On the flaps 6 there are, furthermore, provided dots 7 to indicate the place where the shutter portions 6 on each of the levers are to be grasped in the operation of the apparatus. The pictures 4 are arranged in such a manner that the pictures of two succeeding leaves 2 indicate the two different positions of movement of a subject, for example, as shown in the picture, an alligator in the act of catching a Negro baby. The succeeding pictures are so arranged also that the spaced lines 5 of one picture are opposite to the spaces between the lines in the adjacent picture. Furthermore, if desired, there may be a large number of the leaves 2 any two adjacent ones of which may be provided with pictures so chosen as to form a combination of pictures, the alternate viewing of which will give the effect of motion. If desired, the flaps or shutter portions 6 may carry any suitable printed legends. This will not interfere with the operation of the apparatus for the reasons hereinafter set forth.

In the operation of my invention, the set of pictures which is to be used to produce the effect of movement is inserted in the slits 1ª in the picture of the cage or show wagon 1. The first of the leaves 2 which the operator desires to use is then grasped at the point indicated by the dot 7 between the thumb and forefinger, and the operator thereupon quickly folds the flap or shutter portion 6 to the left so that the shutter portion 6 finally covers the picture 4. Before this has been accomplished, however, the operator or person viewing the action of the apparatus will have received an impression from said picture 4 and when the flap or shutter portion 6 has entirely covered up the picture 4 there will be a momentary interval of time allowed so as to permit the eye to accommodate itself to the next picture. The next picture becomes visible by the further movement of the flap 6 to the left as indicated in Fig. 4. Thereafter the flap or shutter portion 6 is moved back again in the reverse direction, first cutting off the second picture from view, and thereafter again bringing the first picture into view. This operation may be repeated as long as desired, the two pictures 4 thus producing the effect of continuous movement of the subject indicated therein. The effect of movement is produced in a very effective manner also because of the fact that the spaced strips comprising one of the pictures registers with the spaces between the strips comprising the other picture so that the impressions given by the two pictures do not become in any way confused by being received upon the same portions of the eye; but one portion of the eye receives the impression from one of the pictures, and another portion, which is unaffected by the first picture, receives the impression from the other picture. By securing the leaves 2 together at their extreme ends, said leaves may be completely separated at any desired point so as to enable the apparatus to be readily grasped at this point, so as to operate the next succeeding 2 leaves to produce the effect of motion in the manner indicated. The position of the parts is such when the apparatus is grasped in this manner, that the leaves not being used do not interfere in any way with the leaves which are being used to produce the effect of motion. The legends which may be carried by the flaps or shutter portions 6 will not interfere in any way with the operation of the apparatus, as said shutter portions 6 will be visible only edgewise or from the rear thereof.

While I have described my invention above in detail, I wish it to be understood that many changes may be made therein without departing from the spirit of my invention.

I claim:

1. An apparatus comprising a plurality of leaves carrying pictures indicating different positions in the movements of a subject, said leaves having free edges adapted to be grasped by the operator, and means whereby the view of one picture is cut off before the succeeding picture appears.

2. An apparatus comprising a plurality of leaves carrying pictures indicating different positions in the movements of a subject, one of said leaves having a free edge adapted to be grasped by the operator, and adapted to be folded back so as to act as a shutter.

3. An apparatus comprising a plurality of leaves carrying pictures indicating different positions in the movements of a subject, said leaves having free edges adapted to be grasped by the operator and adapted to be folded back so as to act as a shutter, said leaves being more than two in number and any two of said leaves carrying pictures adapted when operated together to indicate motion of the subject carried thereon, said leaves being attached together at their extreme ends.

4. An apparatus comprising a plurality of leaves carrying pictures indicating different positions in the movements of a subject, one of said leaves having a free edge adapted to be grasped by the operator, each of said pictures being comprised of a plurality of spaced strips in such a manner that the strips of one picture register with the spaces of an adjacent picture.

5. An apparatus comprising a plurality of leaves carrying pictures indicating different positions in the movements of a subject, one of said leaves having a free edge adapted to be grasped by the operator, and adapted to be folded back so as to act as a shutter, each of said pictures being comprised of a plurality of spaced strips in such a manner that the strips of one picture register with the spaces of an adjacent picture.

6. An apparatus comprising a plurality of leaves carrying pictures indicating different positions in the movements of a subject, said leaves having free edges adapted to be grasped by the operator, said leaves being more than two in number and any two of said leaves carrying pictures adapted when operated together to indicate motion of the subject carried thereon, said leaves being attached together at their extreme ends, each of said pictures being comprised of a plurality of spaced strips in such a manner that the strips of one picture register with the spaces of an adjacent picture.

7. A plurality of superimposed leaves carrying pictures in spaced strips so arranged that the strips of each picture register with the spaces in the other picture.

8. A plurality of superimposed leaves carrying pictures in spaced strips so arranged that the strips of each picture register with the spaces in the other picture, said leaves being pivotally connected together for relative movement.

9. A plurality of superimposed leaves carrying pictures in spaced strips so arranged that the strips of each picture register with the spaces in the other picture, the spaces being indicated as dark bars.

10. In combination, the representation of a cage or show wagon having recesses and a movable picture insert carried therein, said movable picture insert comprising a plurality of pictures showing different positions of a subject, and pivotally connected together at one side of said representation.

11. In combination, the representation of a cage or show wagon having recesses and a movable picture insert carried therein, said pictures being comprised of spaced strips arranged so that the strips of one picture register with the spaces in an adjacent picture.

12. In combination, the representation of a cage or show wagon having recesses and a movable picture insert carried therein, said movable picture insert comprising a plurality of pictures showing different positions of a subject, and pivotally connected together at one side thereof, said pictures being comprised of spaced strips arranged so that the strips of one picture register with the spaces in an adjacent picture.

13. In combination, the representation of a case or show wagon having recesses and a movable picture insert carried therein, said pictures being comprised of spaced strips arranged so that the strips of one picture register with the spaces in an adjacent picture, and the spaces being made to indicate the dark bars of the cage.

14. In combination, the representation of a cage or show wagon having recesses and a movable picture insert carried therein, said movable picture insert comprising a plurality of pictures showing different positions of a subject, and pivotally connected together at one side thereof, said pictures being comprised of spaced strips arranged so that the strips of one picture register with the spaces in an adjacent picture, and the spaces being made to indicate the dark bars of the cage.

15. In combination, the representation of the outline of a cage, a movable picture carried within said outline, said picture comprising a plurality of individual pictures showing different positions of a subject and pivotally connected together at one side thereof, said pictures being comprised of spaced strips and the spaces indicating the bars of the cage.

In testimony that I claim the foregoing I have hereunto set my hand.

CHARLES W. SAALBURG.